Figure 1:
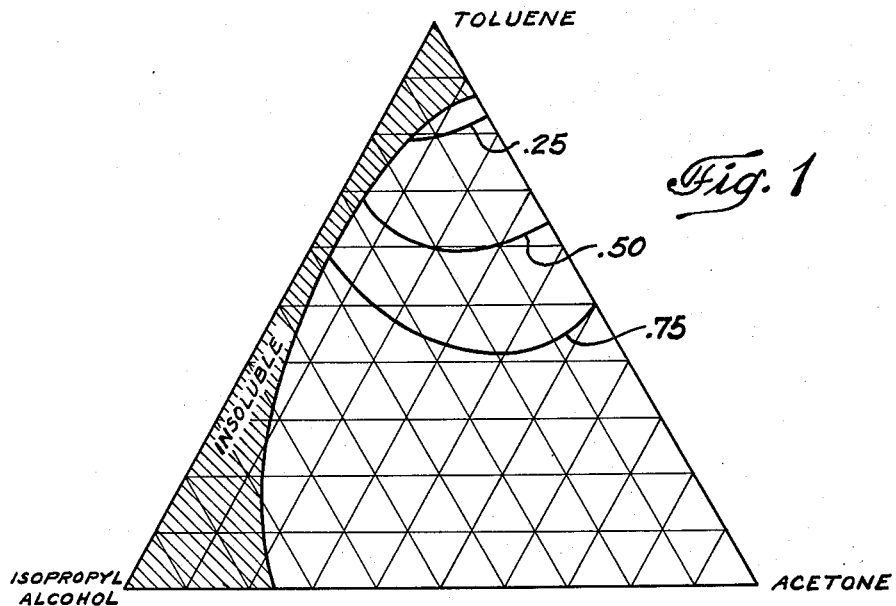
Figure 2:
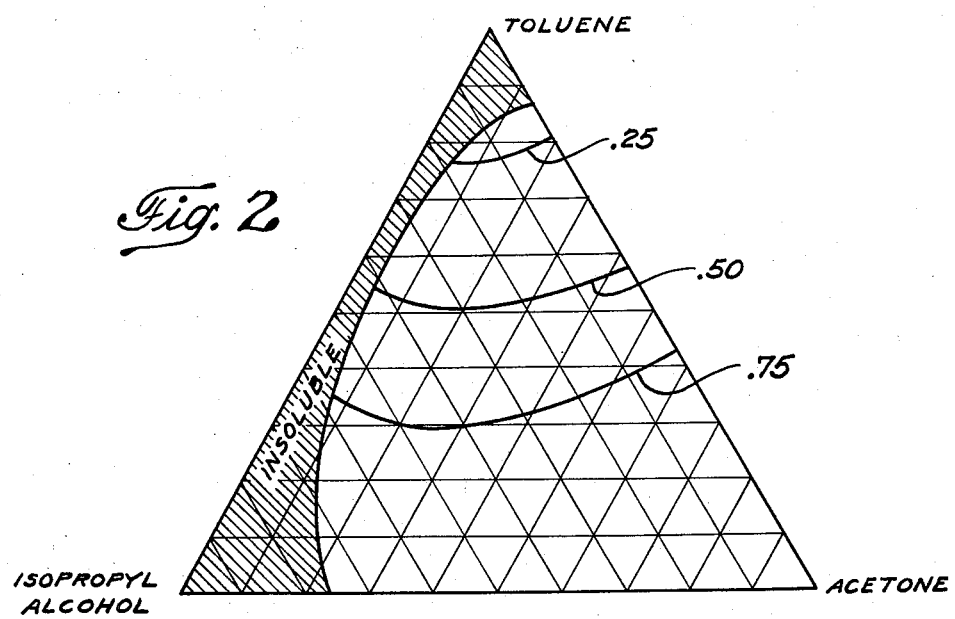

INVENTOR.
WINIFRED CHRISTINA COLLINS

2,913,355
ADHESIVE TAPE WITH LOW ADHESION BACKSIZE COATING

Winifred Christina Collins, New Brunswick, N.J., assignor, by mesne assignments, to Johnson & Johnson, New Brunswick, N.J., a corporation of New Jersey Application December 27, 1955, Serial No. 555,638

15 Claims. (Cl. 117—68.5)

This invention relates to normally tacky and pressure-sensitive sheets or tapes, and in particular to an improved normally tacky and pressure-sensitive sheet or tape provided with a novel low adhesion backsize coating or release agent on the back surface of said sheet or tape.

Normally tacky and pressure-sensitive tapes are usually prepared and sold in rolls and are put to their ultimate use directly from the roll. Whenever a normally tacky and pressure-sensitive tape is applied to a highly compatible backing and the resulting tape is rolled or stacked up, "freezing" occurs between the adhesive united to the backing of one layer of tape and the backing of the adjacent layer of tape, in the absence of some means to prevent it. When "freezing" occurs, unwinding of the tape or the removal of one layer from another in general and subsequent successful use is impossible. Whenever unwinding of a roll of tape becomes difficult, there occurs an offsetting of the adhesive resulting in a loss of tack of the adhesive.

Accordingly, where there is a high compatibility between the backing and the normally tacky and pressure-sensitive adhesive, it has been the practice to provide the back face of the backing with a release agent, and/or backsize coating to prevent "freezing." When the backing is of the non-fibrous or film type so as to provide a smooth back face, release agents may be coated thereon as a continuous film but not without difficulty. When the backing is of the fibrous type, however, wherein the back surface thereof is rough, it is even more difficult, if not impossible, to coat thereon a release agent in such a manner as to produce a tape having easy unwind without detracting from the tack of adhesive used.

The release agents in use or known are characterized by extreme potency in that only very thin films are required to effect the desired easy unwind, and also by an extreme tendency to detract from the adhesiveness or tackiness of pressure-sensitive adhesives brought in contact therewith. This tendency is caused by offsetting of the release agent from the backing to the pressure-sensitive surface by failure of the bond between the release coating and the substrate and/or by splitting of the release agent film or picking off of particles from the surface of the release agent film by the adhesive. Known release agents are characterized in general both by a low order of adhesion to most surfaces, which aggravates the danger of bond failure between release coat and substrate, and by a rather low order of cohesive strength, which aggravates the danger of splitting of the release agent film or of picking off of surface particles. For these reasons a very thin film is necessary, thus providing both improved anchorage and improved cohesive strength. The coating of such uniform thin film, of the order of magnitude of a hundred thousandth of an inch thick or less, on a rough or porous surface is impossible while maintaining an effective coverage on such surface. For this reason it has always been necessary to first coat the rough or porous backing with a surface filling size coat, for the purpose of decreasing the surface porosity and providing a smooth backing surface. While one can readily obtain a non-porous surface coating, the provision of a smooth even coating on many types of backing such as creped paper is not readily accomplished. Thus it is impossible to provide a uniformly thin film of the release coat to such a surface since the solution of release coat will always tend to run in to fill the low spots regardless of the method of application. While these problems do not exist in coating the usual smooth film backings, there remains the problem of the inherent difficulties of accurately coating very thin films of release agent alone, which difficulty cannot always be solved by expensive coating methods and tedious and time-consuming quality control effort.

Accordingly, it is an object of this invention to provide improved normally tacky pressure-sensitive adhesive sheets or tapes having easy unwind characteristics, yet retaining their full tack or adhesiveness. Another object of this invention is to provide a novel composition of matter especially useful for providing a release coat on a rough or fibrous backing, such as creped paper impregnated with an elastomer, or to a plain unsized paper. A still further object of this invention is to provide a novel method for application of a low adhesion backsize coating or release agent to the back surface of a backing, and in particular a rough or fibrous backing, useful in forming improved normally tacky pressure-sensitive sheets or tapes. A still further object of this invention is to provide a novel method for the production of improved normally tacky and pressure-sensitive tapes which permit easy winding thereof when in the form of rolls with very little effort, yet resisting any offsetting to the surface of the normally tacky and pressure-sensitive adhesive which would result in a loss of tack of the adhesive. A still further object of this invention is to provide novel improved interliners to be wound in a roll between layers of tape which have been coated with pressure-sensitive adhesive on both sides, preventing adherence or fusing together of layers and allowing easy unwinding. Yet a further object of this invention is to provide novel improved protective sheets to be applied to the tacky surface of pressure-sensitive labels or any article which has a tacky surface, to protect the tacky surface until ready for use, at which time the protective sheet may be easily and quickly removed, leaving the surface with all of its original aggressively tacky properties unimpaired.

It has been found that the foregoing objects of this invention can be realized by the utilization of a novel backsize composition which is in the form of a substantially homogeneous solution before it is applied to the back face and coated thereon. The novel backsize composition of this invention in general comprises a film-former agent, a lesser amount of a release agent, a solvent for the film-former agent, hereinafter referred to as the "active solvent," and a solvent for the release agent, hereinafter referred to as the "selective solvent," which is a non-solvent for the film-former and miscible with the active solvent, said ingredients being in amounts to form a substantially homogeneous and relatively stable solution. It has been found that when this novel solution is applied to a substrate or back face of a backing and dried to form a coating, the formed coating imparts to the surface treated high release characteristics. While the present invention is not limited to any theory of action, it is believed that the solution of this invention forms a coating of unusual release characteristics due to a phase separation which occurs or is enhanced during the drying operation in forming the coating. While the exact mechanism is not known, it is believed that phase separation and stratification of materials occurs during drying so that the surface or outer side of the formed coating is rich in release agent relatively, and the underside of the coating is rich is film-former agent relatively.

More particularly, the film former agent to be used in accordance with this invention is characterized by toughness and flexibility and should have good adhesion to the particular substrate to which the novel backsize composition is to be applied. Moreover, it should form a continuous film at low coating weight of the order of 0.1 to 1.0 oz. per sq. yd. depending upon surface roughness and porosity. Thus, any of the known film-former agents recognized in the art as having the aforementioned characteristics may be used. Hence, the film-former agent may be any of several tough flexible materials, recognized in the art as suitable for surface sizing of tape backings. Examples are nitrocellulose, either plain or plasticized with a suitable non-migrating plasticizer such as di-octyl phthalate, n-octyl n-decyl phthalate, a liquid polyester or the like, a vinyl such as copolymer of vinyl acetate-vinyl chloride, polystyrene, copolymers of a major proportion of styrene with a minor proportion of a conjugated diene, e.g. butadiene, isoprene, and the like, any of which may be either plain or plasticized. The particular choice of film-former will depend on the substrate being used, choosing to obtain a high bond strength between the film-former and substrate. For instance, polystyrene has high bond strength to a paper saturated with butadiene styrene copolymer, but nitrocellulose would be preferable if the base paper were saturated with a butadiene-acrylonitrile copolymer.

It has been found that the release agent useful in this invention can be any polymeric material having alkyl side chains of 12 or more carbon atoms which has only limited compatibility in the dry state with the particular film-former chosen, but which may be combined in relatively homogeneous and stable solution with the film-former agent by proper choice of solvents, or a monomer or monomer combination capable of polymerizing in situ to form such a polymeric agent. The particular backbone structure of the release agent is relatively unimportant, as is the method of attachment of the alkyl chain to the backbone which may be direct or through ester, ether or any other linkages. Examples of materials having the aforementioned characteristics and suitable as release agents for the purpose of this invention include polyvinyl stearate or laurate, copolymers of vinyl stearate with vinyl acetate or maleic anhydride or both, copolymers of octadecyl acrylate or methacrylate with acrylic acid or methacrylic acid, or heteropolymers such as glyceryl monostearate reacted with toluene disocyanate, sorbitan monostearate reacted with toluene disocyanate, n-pentadecyl resorcinol reacted with tetra-isopropyl titanate, polymers of itaconic acid reacted with cetyl alcohol, glyceryl monostearate reacted with phthalic anhydride, or the like. Or the release agent may be a material or a composition capable of polymerizing in situ to form such a polymer, as for example, stearate-chromic chloride, or a mixture of sorbitan monostearate and toluene diisocyanate. The particular choice of release agent depends on the film-former chosen, on the basis that it must be of only limited compatibility therewith. For example, a terpolymer of vinyl stearate-maleic anhydride-vinyl acetate gives excellent results with nitrocellulose but cannot be used with a vinyl copolymer film-former because it is completely compatible in the solid form.

Any solvent or mixture of solvents in which the film-former agent is soluble may be used as the active solvent. Preferably, it is low boiling. Thus the particular active solvent used can be chosen entirely on the basis of the particular film-former agent employed. For example, for nitrocellulose either a straight ketone or ester or a mixture of ketone or ester with alcohol or other latent solvent may be used. In general, a low boiling mixture is desirable, both for speed in drying and for insuring that in drying the film-former will become immobilized before the release agent, although if the release agent happens to be insoluble in the film-former solvent, this precaution is less important.

Examples of suitable active solvents for nitrocellulose and vinyl chloride-vinyl acetate copolymers are the aliphatic ketones such as mesityl oxide, acetone, methyl ethyl ketone, the aromatic ketones such as acetophenone, and the cyclic ketones such as cyclohexanone and isophorone. Additional solvents for this purpose include ester solvents such as butyl acetate, ethylene glycol monomethyl ether acetate; the glycol ether solvents such as ethylene glycol monoethyl ether; aliphatic ether solvents such as ethyl ether; cyclic ethers such as tetrahydrofuran, dioxane; halogenated hydrocarbons such as ethylene dichloride and the nitroparaffins such as nitromethane. Typical solvents for the polystyrene and alkyd resins include aliphatic hydrocarbon solvents such as octane, aromatic hydrocarbons such as toluene, cyclic hydrocarbons such as terpenes and cyclohexane.

The selective solvent which is a non-solvent for the film-former but which is a solvent for the release agent can be chosen primarily on the basis of the particular film-former and release agent used. However, the choice must be made bearing in mind the fact that the resulting solution must be relatively homogeneous and stable at least for a period of time necessary to coat the material. In general, the selective solvent should be relatively higher boiling than the active solvent for best results to insure that after immobilization of the film-former the release agent will still be capable of migrating toward the surface.

Examples of suitable selective solvents for all of the heretofore mentioned release agent with the exception of stearato chromic chloride are the aliphatic, aromatic and cyclic hydrocarbons such as toluene, octane, terpene and cyclohexane. Suitable solvents for stearato chromic chloride include the alcohols such as ethyl alcohol, cyclohexanol.

From the foregoing, it is seen that the proportions of the ingredients in the backsize composition may vary over a wide range dependent upon the particular film former, release agent used and the desired characteristics of the coat. In general, substantially homogeneous and relatively stable solutions are formed wherein the solids (film-former and release agent) are in an amount from about 3 to about 40% by weight, and preferably 10 to 30%, and the solvents (active solvent and selective solvent) are in an amount from about 97% to about 60%, and preferably from 90 to 70%. With respect to the solids, the film-former is generally in an amount from 80% to 98%, and preferably 85 to 95%, by weight of total solids, and the release agent in an amount of from about 20% to about 2%, and preferably from about 15% to about 5%. As indicated hereinabove, the proportions of selective solvent and active solvent will depend upon the particular film-former and release agent employed. The relative proportions of solvents are such that a substantially homogeneous and relatively stable solution is obtained. The novel backsize compositions of this invention may be applied to the substrate in any conventional manner as, for example, by the use of a roll coater, knife coater, spray coater, etc. In general, the backsize coatings are applied at a coating weight of about 1.0 oz. per sq. yd. down to a minimum weight per sq. yd., which will give a continuous coating, as, for example, 0.05 ounce/sq. yd.

The backsize coating may be dried in any conventional manner. If desired, it may be dried at room temperature, but generally an elevated temperature, in the range of 180 to 300° F., is used in order to shorten the time of drying. Any conventional drier may be used for this purpose, such as a hot air drier.

As heretofore indicated, the backsize compositions of this invention are particularly useful in providing release coatings for rough or porous sheets, as, for example, fibrous backings conventionally used in normally tacky and pressure-sensitive tapes. Examples of such backings are those formed from kraft pulp and the like, and which may include impregnants for unifying purposes. The sheets may be flat, creped or otherwise treated to increase stretchability. Paper sheets made from rope or rag fibers or other fibrous material may be used, as well as cloth or non-woven fabrics such as those manufactured by the Chicopee Mfg. Corp. and sold under the trademark "Maslan." Also, the backsize compositions in forming the novel tapes may be applied to non-fibrous films such as cellophane, vinyl resins, polyethylene terephthalate, etc.

In forming the novel tapes of this invention, the adhesive may be applied to the backing in any conventional manner, as, for example, by calendering, reverse roll-coater, knife-coater, etc. The adhesive is generally coated at a dry coating weight of about 1 to 3 ounces per sq. yd. The adhesive is preferably applied to the backing from solvent solution or dispersion using aliphatic or aromatic solvents and subsequent drying. If desired, the backing may be provided with a suitable conventional priming coating to improve the adhesion of the coating thereto. Suitable primer coatings are, for example, those disclosed in Bemmels Patent No. 2,647,843. Any suitable normally tacky and pressure-sensitive adhesive useful in making tapes may be used. Such adhesives are generally compounded from a composition including an elastomeric component, which is usually a natural or synthetic rubber or similar elastomeric polymer, and a resinous component compatible with the rubber and adapted to impart tack to the adhesive composition, together with suitable amounts of various types of additives such as conventional fillers, antioxidants, etc. The elastomeric component, tackifying resin, and fillers, when used, are proportioned to obtain in the adhesive properties of high internal strength and cohesiveness and high adhesiveness. Examples of suitable adhesives for forming tapes in accordance with this invention are as follows:

Adhesive A

| | Parts |
|---|---|
| Pale crepe natural rubber | 58.4 |
| Butadiene-styrene copolymer 71:29 ratio, 70 Mooney | 8.3 |
| Aluminum hydrate | 33.3 |
| Polyterpene resin, M.P. 115° C. | 53.3 |
| Oil-soluble non-heat-hardening phenolic resin, M.P. 165° C. | 6.7 |
| Alkylated polyhydroxy phenol | 1.3 |
| Di tertiary butyl para cresol | 1.3 |
| Toluene | 335.0 |

Adhesive B

| Pale crepe natural rubber | 133.5 |
|---|---|
| Polyterpene resin, M.P. 115° C. | 13.5 |
| Di tertiary butyl para cresol | 1.0 |
| Alkylated polyhydroxy phenol | 1.0 |
| Tetrasodium salt of ethylene diamine tetraacetic acid | 1.0 |
| Toluene | 814.0 |
| Isopropyl alcohol | 33.0 |

Adhesive C

| Butadiene-styrene copolymer 71:29 ratio, 70 Mooney | 31.0 |
|---|---|
| Pure gum reclaimed natural rubber from nipple stock | 43.0 |
| Smoked sheet natural rubber | 12.5 |
| Zinc oxide | 50.5 |
| Di tertiary butyl para cresol | .94 |
| Alkylated polyhydroxy phenol | .94 |

| Phenolic modified polyterpene resin, M.P. 115° C. | 57.0 |
|---|---|
| Triphenyl phosphate | 5.0 |
| Tetra ethylene pentamine | 1.0 |
| Toluene | 262.5 |

Adhesive D

| Pale crepe natural rubber | 58.0 |
|---|---|
| Aluminum hydrate | 33.75 |
| Lanolin | 6.0 |
| Alkylated polyhydroxy phenol | 1.25 |
| Polyterpene resin, 115° C., M.P. | 19.75 |
| Polyterpene resin, 70° C., M.P. | 9.25 |
| Zinc rosinate, M.P. 135° C. | 17.1 |
| Heat-advancing oil soluble phenolic resin, M.P. 185° C. | 9.25 |
| Toluene | 286 |

The following are examples of the preparation of the novel backsize compositions and normally tacky and pressure-sensitive adhesive tapes utilizing the novel backsize compositions in accordance with this invention. Unless otherwise indicated, the amounts given are by weight.

Example I

The example illustrates the preparation of a novel backsize composition formed by combining 100 parts of a film-former solution A having the following recipe:

| | Parts |
|---|---|
| Nitrocellulose (R.S ⅝ sec.) | 18.1 |
| Di-octyldecyl phthalate | 5.9 |
| Isopropyl alcohol | 33.5 |
| Methyl ethyl ketone | 42.5 | with 4.8 parts of release agent solution A, diluted with 60.4 parts toluene, said release agent A having the following recipe:

| | Moles |
|---|---|
| Vinyl stearate | .8 |
| Maleic anhydride | .2 |
| Vinyl acetate | 1.0 |

The above monomers were polymerized in hexane at 72° C. for 7 hours in the presence of 0.5% by weight of benzoyl peroxide catalyst, giving a 30% solid solution in hexane.

Tapes were prepared by coating one face of 30 lb. per ream basis weight (480 sheets, 24" by 36") crepe kraft paper, which had been saturated with a Buna N synthetic rubber latex to give 100% impregnation (percent latex solids based on original paper) with the hereinbefore disclosed adhesives A, B, C and D, respectively, the adhesives being coated at a dry coating weight of 2.5 oz./sq. yd. Each of the tapes was then backsized with the backsize composition of Example I at a dry backsize coating weight of 0.3 oz./sq. yd.

Another set of tapes was produced, using the same kraft crepe paper, adhesives and adhesive coating weight as employed in the production of the aforementioned tapes, but using, in place of Example I, film-former solution A in forming the backsize coat at a dry backsize coating weight of 0.3 oz./sq. yd.

The backside coats formed from Example I, containing about 5.6% release agent and 94.4% film-former, and having been coated from a mixture of 54% active solvent and 46% selective solvent, were compared with the coat formed from film-former solution A for release characteristics, using the following method of testing:

The tape in the form of a roll is aged for one week with adhesive in contact with coating under test. The roll is then placed on a frictionless mandrel free to rotate and unwound, the force required to unwind the tape being recorded in ounces per inch width.

The unwind testing results of the coats formed from the backsize composition of Example I when aged in contact with adhesives A, B, C and D, respectively, and compared with the coat formed from film-former solution A were as follows:

| Adhesive | Ratio of Unrolling Adhesion of Example I/Film-Former Solution A |
|---|---|
| A | 0.8 |
| B | 0.5 |
| C | 0.36 |
| D | 0.3 |

As will be noted from the above data, the backsize composiiton of the present invention (Example I), utilizing a release agent and a selective solvent, gives a backsize coat having better release characteristics than a coat formed from a composition including the same film-former and active solvent but containing no release agent or selective solvent. It will also be noted that this improvement in release characteristics pertains to normally tacky and pressure-sensitive adhesives in general, as shown by the above results wherein four different normally tacky and pressure-sensitive adhesive compositions were tested.

The following are examples of additional backsizing compositions prepared in accordance with this invention:

*Example II*

100 parts of film-former solution A is combined with 13.2 parts of release agent solution A diluted with 60.4 parts of toluene.

*Example III*

The same as in Example I except that 4.8 parts of xylene are added to release agent solution A before addition to film-former solution A.

*Example IV*

The same as in Example I except that 4.8 parts of xylene are added to film-former solution A before addition to release agent solution A.

*Example V*

The same as in Example I except that 4.8 parts additional isopropyl alcohol are added.

*Example VI*

The same as in Example I except that 14.4 parts of xylene are added.

*Example VII*

The same as in Example I except that 1.9 parts of release agent solution A are used instead of 48 parts and 14.4 parts of xylene are added.

Tapes were produced using the aforementioned 30 lbs. kraft crepe paper as the backing and adhesive A as the adhesive, said adhesive being applied in a conventional manner at a coating weight of 2.5 oz./sq. yd. These adhesive tapes were then backsized with the backsize compositions of Examples I–VII, respectively. The unwind testing results of the backsize coats formed from the backsize compositions of Examples I to VII, when aged in contact with adhesive A and compared with the coat formed from the film-former solution A, are shown hereinafter.

| Backsize Coat Former from Backsize Composition Indicated | Ratio of Unrolling Adhesion of Example Indicated/Film Former Solution A |
|---|---|
| Example I | 0.80 |
| Example II | .72 |
| Example III | .28 |
| Example IV | .46 |
| Example V | .85 |
| Example VI | .22 |
| Example VII | .48 |

From the above data, it will be noted from Example I that the effectiveness of a system with release agent at a 5.5% level based on solids and containing but 45.6% of the total solvent as selective solvent, can be enhanced greatly by use of an additional 1.9% of selective solvent, which is high boiling relative to active solvent (Example III). However, the use of up to 19.4 release agent in the same system, and the inclusion of as much as 3.6% additional selective solvent (hexane from the terpolymer solution), as shown in Example II, is much less effective than Example III when compared with Example I, because the selective solvent is relatively too volatile as compared to the active solvent. Example IV show that the selective solvent can be added with the active solvent to obtain a coating composition which exhibits release, but the release obtained is not quite as great as when the selective solvent is added directly to the release agent prior to mixing, and the active solvent is used with the film-former prior to blending the two solutions (III). Example V indicates that a lower boiling alcohol is ineffective as a selective solvent in the composition, and in effect impairs release as compared with Example III. It should be noted that isopropyl alcohol is not a solvent for the release agent, whereas in Example VI it is shown that a high boiling selective solvent which is a good solvent for the release agent furnished added effectiveness to the coating as compared with Example III. It is possible by choice of selective solvent level to decrease the amount of release agent necessary, or vice versa, with a given level of release agent to add more or less selective solvent to strike the most economical balance for any preferred coating, as shown in Example VII, as compared with Example IV. In Example VII, having 2.2% release agent based on solids and approximately 50% selective solvent based on total solvents, a performance is obtained approximately equivalent to that obtained by using Example IV having 5.8 release agent based on solids and only 47.5% selective based on total solvent.

Attention is invited to Figure I showing the relative release obtained when the hereinbefore disclosed release agent solution A (see Example I) is incorporated in a nitrocellulose lacquer which was made up with various solvent balances, including toluene, isopropanol and acetone. The amount of release agent was 5.5. The relative release obtained is shown by the lines indicating a level of .25, 0.5, 0.75 as compared with adhesion to backing of coat formed from film-forming solution A with no release agent. From the graph of Fig. 1, it will be noted that as the toluene selective solvent is increased, relatively low adhesions to backing are obtained. The adhesive used in the foregoing test was that disclosed before as adhesive A.

In Figure II a similar ternary diagram is shown in which the same film-former solution A is used in connection with release agent solution B, which was prepared as follows:

68 parts of octadecyl acrylate and 32 parts acrylic acid was dissolved in 300 parts benzene, and 1% of benzoyl peroxide based on monomer content was added gradually as a saturated solution in benzene. The polymerization was carried out by allowing the exothermic reaction to proceed until the temperature in the reaction flask had begun to drop. Heat was then applied and the polymerization was then allowed to proceed at reflux temperature until a very viscous solution was obtained just short of gelation. The 25% solution obtained was added to nitrocellulose lacquers in a solvent mixture of toluene, isopropyl alcohol and acetone as shown in the ternary diagram of Fig. II. The release values obtained again show that as a selective solvent for the release agent (toluene) is increased, relatively easier unrolling is obtained as compared with an identical lacquer containing no release agent or selective solvent. The release levels 0.25, 0.5 and 0.75 are approximately the same when the solids content of the dried coating composition contains 5.5 release agent as were found in Fig. I when used in conjunction with the hereinbefore described adhesive A.

Illustrations of other film-formers and release agents are shown in the following examples:

Example VIII

A backsize composition was formed by combining 376 parts of a film-former solution B having the following recipe:

| | Parts |
|---|---|
| Copolymer of vinyl chloride-vinyl acetate containing 85–88% vinyl chloride | 90 |
| "Flexol-R-2H" (polyester plasticizer mfg. by Carbon & Carbide) | 36 |
| Toluene | 125 |
| Methyl ethyl ketone | 100 |
| Methyl isobutyl ketone | 25 | with 18 parts of release agent solution C having the following recipe:

| | Parts |
|---|---|
| Sorbitan mono stearate | 20 |
| Toluene diisocyanate | 5 |
| Toluene | 75 |
| Triethyl amine | .2 |

The solution was allowed to react at room temperature for 18 hours.

Example IX

The same composition as Example VIII except that 12 parts of the methyl isobutyl ketone of film-former solution B was replaced by an additional 12 parts of methyl ethyl ketone.

Example X

A backsize composition was formed by combining 376 parts of film-former solution C having the following recipe:

| | Parts |
|---|---|
| Copolymer of vinyl chloride-vinyl acetate containing 85–88% vinyl chloride | 90 |
| "Flexol-R-2H" | 36 |
| Isopropyl alcohol | 40 |
| Methyl ethyl ketone | 90 |
| Toluene | 120 | with 18 parts of release agent solution C (see Example VIII).

Example XI

A backsize composition was formed by combining 376 parts of film-former solution D having the following recipe:

| | Parts |
|---|---|
| Copolymer of vinyl chloride-vinyl acetate containing 85–88% vinyl chloride | 90 |
| "Flexol-R-2H" | 36 |
| Methyl ethyl ketone | 187 |
| Toluene | 63 | with 18 parts of release agent solution C.

Example XII

A backsize composition was formed by combining 376 parts of film-former solution E having the following recipe:

| | Parts |
|---|---|
| Copolymer of vinyl chloride-vinyl acetate containing 85–88% vinyl chloride | 90 |
| "Flexol-R-2H" | 36 |
| Methyl ethyl ketone | 125 |
| Toluene | 125 | with 18 parts of release agent solution C.

In Examples VIII–XII a coating of the solutions disclosed is made on a backing as follows:

Semi-bleached soft wood kraft paper of 27 lb. basis weight per ream is impregnated in Buna N latex to give 85% impregnation (percent rubber based on original paper) and the solutions shown are coated at 0.25 oz./sq. yd. This backing is dried to free it from solvents and adhesive A is coated at 1.75 oz./sq. yd. The formed rolls of tape are aged for 1 week, as previously described, and relative unrolling adhesion compared to the coating formed from film-former solution B is determined.

| Example | Ratio Unrolling Adhesion |
|---|---|
| Example VIII | 0.37 |
| Example IX | .16 |
| Example X | .80 |
| Example XI | .40 |
| Example XII | .09 |

As will be noted by those skilled in the art, toluene is a selective solvent for materials of the class of release agent C and is a non-solvent for vinyl copolymer of the type shown. Hence, as the toluene is more or less volatile than the active solvents used, its selective powers are poorer to greater as shown by comparing Example XII versus Examples XIII and IX. The selective solvent is also preferably present in relatively higher amounts for easiest unwinding, e.g. Example XI v. Example XII; and the effect of adding alcohol, which is solvent for neither the film-former nor the release agent, is to impair the whole system.

Example XIII

A backsize composition was formed by adding 1½% of stearato chromic chloride (release agent solution D) as a 30% solution in isopropyl alcohol to film-former solution F having the following recipe:

| | Gms. |
|---|---|
| Polystyrene | 256 |
| Ortho nitro biphenyl | 7.5 |
| Toluene | 27.5 |

The above Example XIII was coated at 0.35 oz./sq. yd. dry weight on a 30 lb. crepe paper backing impregnated with a 50:50 butadiene-styrene copolymer (100% dry polymer pick up) and the thus coated paper was aged for one week in a roll of tape in contact with a 2.75 oz./sq. yd. coated weight of adhesive Example C. The ratio of adhesion coating with release coating of Example XIII as compared with film-former solution F was 0.25.

Example XIV

To film-former solution D was added 5% of a solution of release agent E having the following recipe:

| | Parts |
|---|---|
| Glyceryl mono stearate | 5 |
| Toluene Diisocyanate | 1 |
| Triethyl amine | 0.2 |
| Toluene | 18.0 |

After admixture, the solution was heated ½ hour at 100° C.

When tested for unrolling adhesion in the same manner and at the same coating weight as in Examples VIII–XII, and using adhesive A, the ratio of unrolling adhesion of coat of Example XIV when compared to coat of film-former solution B was 0.30.

Example XV

A backsize composition was prepared by combining 376 parts of field-former solution D with 18 parts of release agent solution F having the following recipe:

| | Parts |
|---|---|
| Pentadecyl resorcinol | 9 |
| Tetra isopropyl titanate | 1 |

The above resorcinol and titanate are heated in 25% solution in toluene at 100° C. for ½ hour.

The above Example XV when coated and tested in the previously described manner, when compared to a coat of film-former solution B, gives an unrolling adhesion ratio of 0.55.

As will be evident to those skilled in the art, the backsize compositions of this invention in addition to providing release coats for normally tacky and pressure-sensitive sheets or tapes may be used in the production of interliners of high release characteristics to be wound in a roll between layers of tape which have been coated with pressure-sensitive adhesives on both sides. They are also useful in the production of protective sheets to be applied to the tacky surface of pressure-sensitive labels or any article which has a tacky surface, to protect the tacky surface until ready for use. Also, the novel backsize compositions of this invention may be used as casting solutions for casting films possessing good release characteristics due to the presence of the release agent in the cast film.

Figure 3:
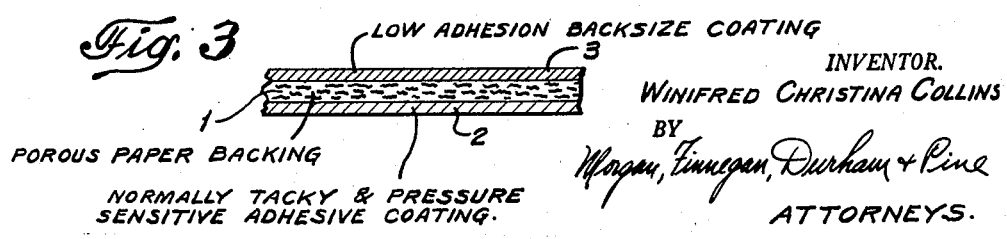

Although it is not believed necessary for understanding the present invention, reference is made to Figure 3 of the drawing. Figure 3 is a vertical cross sectional view of a tape prepared in the manner described hereinbefore in detail. The tape comprises a backing of porous paper 1 having an adhesive coating 2 on one side thereof and a backsize coating 3 on the opposite side.

The invention in its broader aspects is not limited to the specific compositions, steps, combinations and improvements described, but departures may be made therefrom within the scope of the accompanying claims without departing from the principles of the invention and without sacrificing its chief advantages.

What is claimed is:

1. A backsize composition, in the form of a substantially homogeneous and relatively stable solution adapted to be applied to a face of a backing to form a thin coat thereon having high release characteristics comprising a film-former agent having the characteristics of toughness, flexibility and good adhesion to the surface to which said backsize composition is to be applied, a release agent in a lesser amount and having the characteristics of limited compatibility with said film-former, an active solvent in which said film-former is soluble, and a selective solvent which is a solvent for said release agent and a non-solvent for said film former, said active solvent and said selective solvent being miscible with each other and in amounts to form a substantially homogeneous and relatively stable solution.

2. A backsize composition in accordance with claim 1, wherein the release agent is a polymeric material having alkyl side chains of at least 12 carbon atoms.

3. A backsize composition in accordance with claim 1, wherein the selective solvent is a higher boiling material than the active solvent.

4. A backsize composition in accordance with claim 1, wherein the film-former agent is selected from the group consisting of nitrocellulose, alkyd resins, copolymers containing a major amount of vinyl chloride, polystyrene and styrene-diene copolymers containing a major amount of styrene.

5. A backsize composition according to claim 1 wherein the film former agent is nitrocellulose and the release agent is a vinyl stearate-maleic anhydride-vinyl acetate terpolymer.

6. A backsize composition according to claim 1 wherein the film former agent is a vinyl chloride-vinyl acetate copolymer and the release agent is a sorbitan monostearate-toluene-diisocyanate reaction product.

7. The method of forming a sheet having high release properties, when in contact with a normally tacky and pressure-sensitive adhesive, on at least one side thereof, comprising applying to at least one side of said sheet a backsize composition comprising a film-former agent having the characteristics of toughness, flexibility and good adhesion to the surface to which said backsize composition is to be applied, a release agent in a lesser amount and having the characteristics of limited compatibility with said film-former, an active solvent in which said film-former is soluble, and a selective solvent which is a solvent for said release agent and a non-solvent for said film-former, said active solvent and said selective solvent being miscible with each other and in amounts to form a substantially homogeneous and relatively stable solution, and then drying said sheet to form a coating on at least one side thereof having high release characteristics when in contact with a normally tacky and pressure-sensitive adhesive.

8. The method in accordance with claim 7, wherein the sheet is a fibrous sheet.

9. The method of claim 8, wherein the sheet is paper.

10. The method of improving the release characteristics of the back side of a normally tacky and pressure-sensitive adhesive tape, comprising a backing having a normally tacky and pressure-sensitive adhesive coated on the front side, said method comprising applying to the back side of said backing a backsize composition comprising a film-former agent having the charteristics of toughness, flexibility and good adhesion to the surface to which said backsize composition is to be applied, a release agent in a lesser amount and having the characteristics of limited compatibility with said film-former, an active solvent in which said film-former is soluble, and a selective solvent which is a solvent for said release agent and a non-solvent for said film-former, said active solvent and said selctive solvent being miscible with each other and in amounts to form a substantially homogeneous and relatively stable solution, and then drying said sheet to form a coating on the back side thereof, having high release characteristics when in contact with a normally tacky and pressure-sensitive adhesive.

11. The method of claim 10, wherein the backing is a fibrous sheet.

12. The method of claim 11, wherein the fibrous sheet is a porous paper.

13. The backsized normally tacky and pressure-sensitive adhesive tape produced in accordance with the method of claim 10.

14. The method of improving the release of the backside of a normally tacky and pressure-sensitive adhesive tape according to claim 10 wherein the film former agent is nitrocellulose and the release agent is a vinyl stearate-maleic anhydride-vinyl acetate terpolymer.

15. The method of improving the release of the backside of a normally tacky and pressure-sensitive adhesive tape according to claim 10 wherein the film former agent is a vinyl chloride-vinyl acetate copolymer and the release agent is a sorbitan mono stearate-toluene-diisocyanate reaction product.

References Cited in the file of this patent

FOREIGN PATENTS

| | | |
|---|---|---|
| 531,497 | Great Britain | Jan. 6, 1941 |
| 149,965 | Australia | Feb. 10, 1953 |